(12) United States Patent
Pakimo et al.

(10) Patent No.: US 10,790,609 B2
(45) Date of Patent: Sep. 29, 2020

(54) FIELD TERMINATION ASSEMBLY SUPPORTING USE OF MISTAKE-PROOF KEYS

(71) Applicant: Honeywell International Inc., Morris Plains, NJ (US)

(72) Inventors: Dawa Pakimo, Bangalore (IN); Vishwanath Balakrishna, Bengaluru (IN); Hemanth Vijaykumar, Bangalore (IN); Karma Bhutia, Bengaluru (IN); Shripurnabodh Deshpande, Bangalore (IN); Jaison Cherian, Bangalore (IN); Chandrashekar Thayumanavan, Bangalore (IN); Dinesh Kumar KN, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/263,144

(22) Filed: Jan. 31, 2019

(65) Prior Publication Data

US 2020/0127411 A1    Apr. 23, 2020

Related U.S. Application Data

(60) Provisional application No. 62/748,607, filed on Oct. 22, 2018.

(51) Int. Cl.
*H01R 13/514* (2006.01)
*H01R 12/70* (2011.01)
(Continued)

(52) U.S. Cl.
CPC ......... *H01R 13/514* (2013.01); *H01R 9/2416* (2013.01); *H01R 12/55* (2013.01); *H01R 12/7076* (2013.01); *H01R 25/006* (2013.01)

(58) Field of Classification Search
CPC .. H01R 13/514; H01R 13/2416; H01R 12/55; H01R 25/006
(Continued)

(56) References Cited

U.S. PATENT DOCUMENTS 4,159,862 A * 7/1979 Funck ................ H01R 13/6453
439/681
4,335,929 A * 6/1982 Abernethy ........... H01R 13/514
439/358

(Continued)

FOREIGN PATENT DOCUMENTS

WO    2012091876 A2    7/2012

OTHER PUBLICATIONS

Kumar KN et al., U.S. Appl. No. 16/008,941 entitled "Intrinsic Safety (IS) Barrier With Associated Energy Limiting Apparatus" filed Jun. 14, 2018, 37 pages.
(Continued)

*Primary Examiner* — Peter G Leigh

(57) ABSTRACT

A system includes a housing having multiple slots. The system also includes multiple adaptor modules each configured to be inserted into one of the slots and perform at least one function related to an associated input or output signal. For each slot-adaptor module pair, the slot includes one of a key and a receptacle configured to receive the key, and the adaptor module includes the other of the key and the receptacle. Each key fits into the receptacle associated with one type of adaptor module and cannot fit into the receptacles associated with other types of adaptor modules. Each receptacle accepts the key associated with one type of adaptor module and cannot accept the keys associated with other types of adaptor modules. Each of at least one of the keys and the receptacles is rotatable to achieve one of
(Continued)

multiple different orientations. Different ones of the keys have different cross-sectional shapes.

16 Claims, 11 Drawing Sheets

(51) Int. Cl.
  *H01R 9/24* (2006.01)
  *H01R 12/55* (2011.01)
  *H01R 25/00* (2006.01)
(58) Field of Classification Search
  USPC .......................................... 439/681, 362, 715
  See application file for complete search history.

(56) References Cited

U.S. PATENT DOCUMENTS

| | | | | |
|---|---|---|---|---|
| 4,595,250 A * | 6/1986 | Joly | ...................... | H01R 13/645 439/61 |
| 4,738,632 A * | 4/1988 | Schmidt | ............... | H05K 7/1441 439/341 |
| 5,254,019 A * | 10/1993 | Noschese | ............. | H01R 13/645 439/681 |
| 5,273,462 A * | 12/1993 | Huser | ................... | H01R 13/645 439/341 |
| 5,370,548 A * | 12/1994 | Laudereau | ........... | H01R 13/629 439/341 |
| 5,805,404 A * | 9/1998 | Kane | ...................... | H04Q 1/146 361/111 |
| 6,302,745 B1 * | 10/2001 | Landis | ............... | H01R 13/6453 439/681 |
| 6,485,336 B1 * | 11/2002 | Zebermann | .......... | H05K 7/1455 439/677 |
| 8,345,440 B2 * | 1/2013 | Wu | ....................... | H05K 7/1455 361/788 |
| 8,911,263 B2 * | 12/2014 | Becavin | ................. | H01R 13/64 439/680 |
| 9,166,341 B2 * | 10/2015 | Wang | .................. | H01R 13/6456 |
| 9,179,560 B2 * | 11/2015 | Yoon | ................... | B60R 16/0238 |
| 9,225,117 B2 * | 12/2015 | Jacobsson | ............ | H01R 13/514 |
| 9,361,247 B1 | 6/2016 | Kumar KN | | |
| 9,478,913 B2 * | 10/2016 | Braunlich | .......... | H01R 13/6456 |
| 9,716,343 B2 * | 7/2017 | Wess | ...................... | H01R 13/642 |
| 2006/0141847 A1 * | 6/2006 | Ngo | ...................... | H01R 13/514 439/378 |
| 2011/0294361 A1 * | 12/2011 | Schrader | ................ | H01R 13/64 439/680 |
| 2012/0033416 A1 * | 2/2012 | Ballard | ................... | F21L 4/027 362/202 |
| 2016/0141808 A1 * | 5/2016 | Stowers | ................ | H01R 24/84 439/607.05 |
| 2018/0343763 A1 | 11/2018 | Kumar KN | | |

OTHER PUBLICATIONS

GE Intelligent Platforms, "PAC8000 Modular I/O", General Electric Company, 2014, 66 pages (see esp. pp. 3 and 5).
Installation Instructions, "POINT I/O 4 Channel High Density Current Input Module", Rockwell Automation, Inc., 2016, 24 pages (see esp. pp. 7, 9, and 10).
"S800 I/O Modules and Termination Units", ABB, 2010, 590 pages (see esp. pp. 17, 26, 39-41, 461-462, 466-467, 471-472, 476-477, 483-484, 490-493, 498-499, 503-504, 509-510, 514-515, 520-521, 526-527, 532-533, 538-539, 544-545, 549-550, 554-555, 559-560, and 564-565).

* cited by examiner

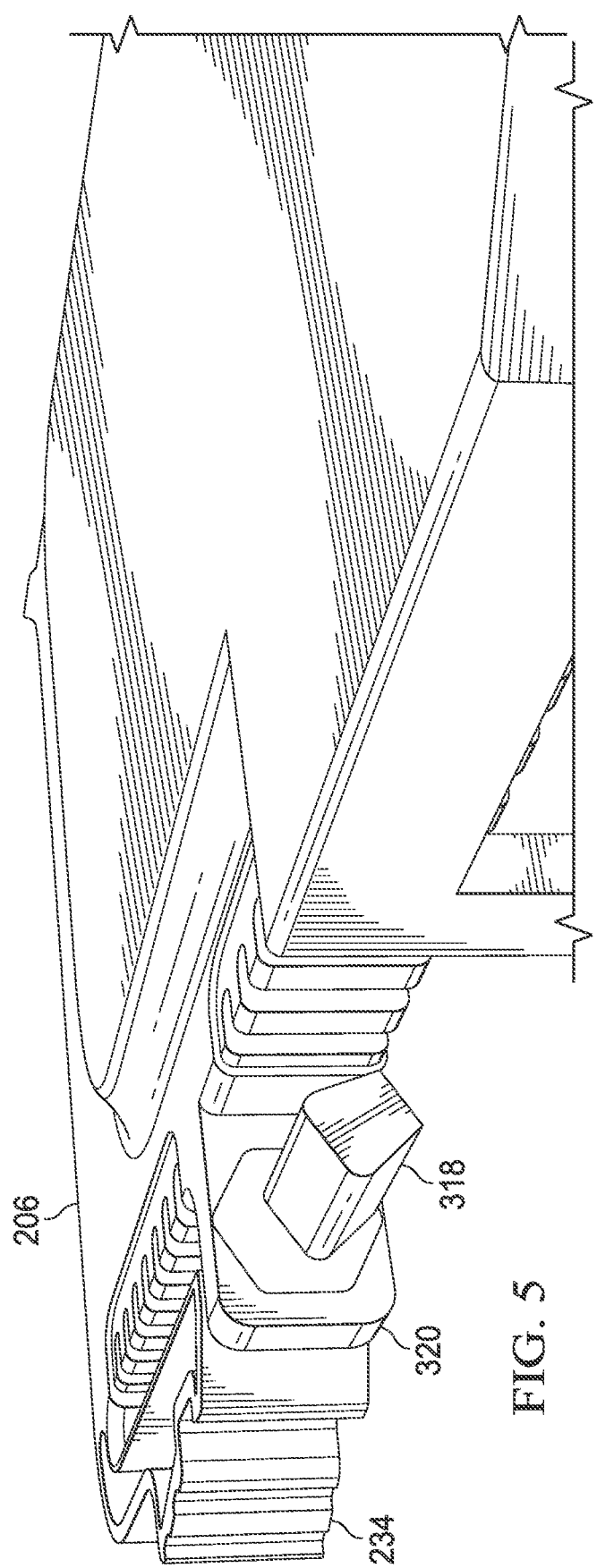

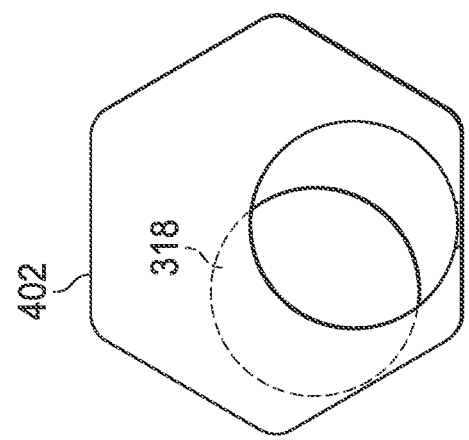
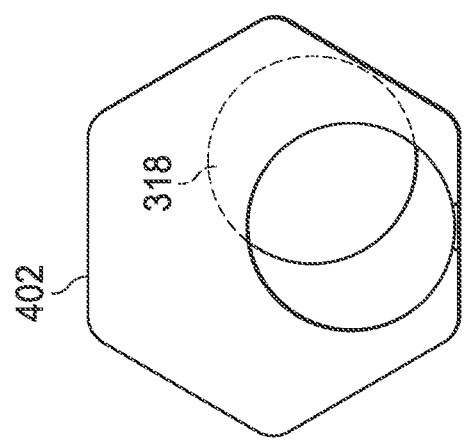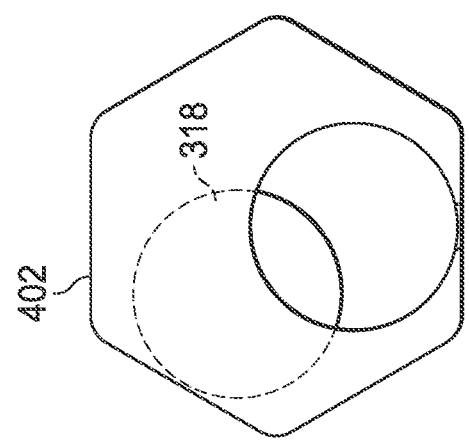
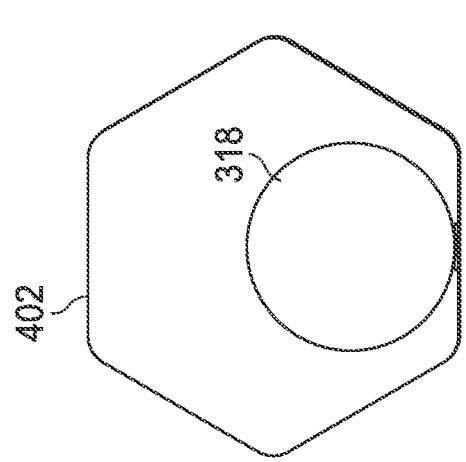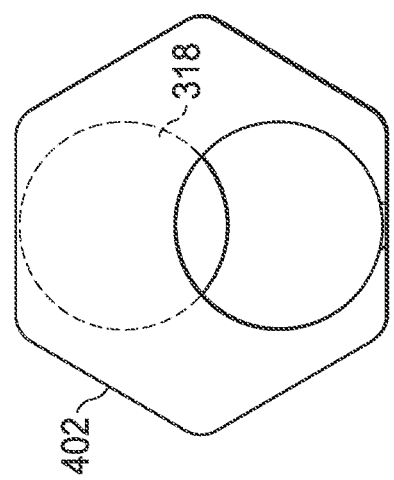

… (US 10,790,609 B2)

FIELD TERMINATION ASSEMBLY SUPPORTING USE OF MISTAKE-PROOF KEYS

CROSS-REFERENCE TO RELATED APPLICATION AND PRIORITY CLAIM

This application claims priority under 35 U.S.C. § 119(e) to U.S. Provisional Patent Application No. 62/748,607 filed on Oct. 22, 2018. This provisional application is hereby incorporated by reference in its entirety.

TECHNICAL FIELD

This disclosure generally relates to input/output (I/O) systems. More specifically, this disclosure relates to a field termination assembly supporting the use of mistake-proof keys.

BACKGROUND

Industrial process control and automation systems are often used to automate large and complex industrial processes. These types of systems routinely include various components including sensors, actuators, and controllers. Some of the controllers can receive measurements from the sensors, possibly through connected input/output (I/O) subsystems, and generate control signals for the actuators. Existing process control and automation systems typically have hardware components participating in control and I/O functions that are installed in control rooms and in the field. These hardware components are often used to gather I/O information from the field, transmit that I/O information to the control rooms, perform various control functions, and transmit I/O information back to the field.

SUMMARY

This disclosure provides a field termination assembly supporting the use of mistake-proof keys.

In a first embodiment, a system includes a housing having multiple slots. The system also includes multiple adaptor modules each configured to be inserted into one of the slots and to perform at least one function related to an associated input or output signal. For each slot-adaptor module pair, the slot includes one of a key and a receptacle configured to receive the key, and the adaptor module includes the other of the key and the receptacle. Each key fits into the receptacle associated with one type of adaptor module and cannot fit into the receptacles associated with other types of adaptor modules. Each receptacle accepts the key associated with one type of adaptor module and cannot accept the keys associated with other types of adaptor modules. Each of at least one of the keys and the receptacles is rotatable to achieve one of multiple different orientations. Different ones of the keys have different cross-sectional shapes.

In a second embodiment, an apparatus includes a housing having multiple slots. Each slot is configured to receive an adaptor module that performs at least one function related to an associated input or output signal. Each slot includes one of (i) a key configured to be inserted into a receptacle of the associated adaptor module or (ii) a receptacle configured to receive a key of the associated adaptor module. Each key fits into the receptacle associated with one type of adaptor module and cannot fit into the receptacles associated with other types of adaptor modules, or each receptacle accepts the key associated with one type of adaptor module and cannot accept the keys associated with other types of adaptor modules. Each of at least one of the keys and the receptacles is rotatable to achieve one of multiple different orientations. Different ones of the keys have different cross-sectional shapes.

In a third embodiment, a method includes inserting multiple adaptor modules into multiple slots of a housing. Each adaptor module is configured to perform at least one function related to an associated input or output signal. The method also includes matching, for each slot-adaptor module pair, a key and a receptacle configured to receive the key. The slot includes one of the key and the receptacle, and the adaptor module includes the other of the key and the receptacle. Each key fits into the receptacle associated with one type of adaptor module and cannot fit into the receptacles associated with other types of adaptor modules. Each receptacle accepts the key associated with one type of adaptor module and cannot accept the keys associated with other types of adaptor modules. Each of at least one of the keys and the receptacles is rotatable to achieve one of multiple different orientations. Different ones of the keys have different cross-sectional shapes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates a portion of an example adaptor module having a mistake-proof key according to this disclosure;

FIGS. 8A through 8F illustrate a third example keying for adaptor modules used with a field termination assembly according to this disclosure;

DETAILED DESCRIPTION

Figure 1:
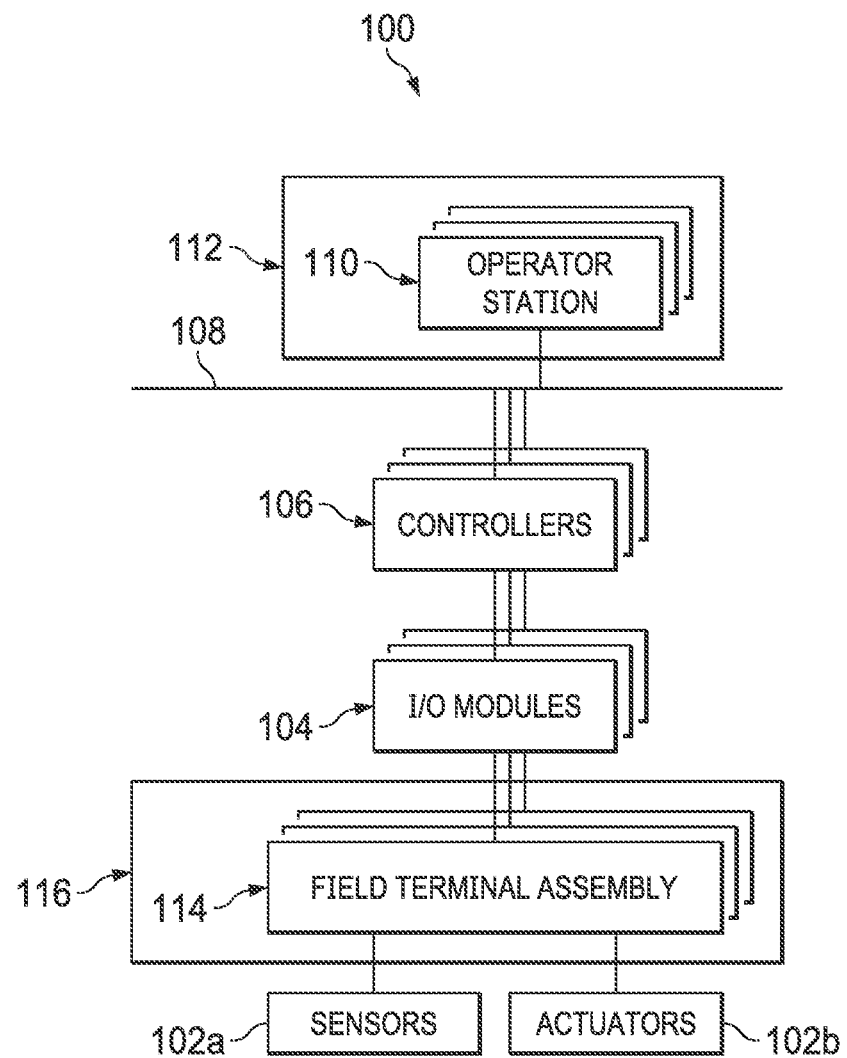
FIG. 1 illustrates an example industrial process control and automation system according to this disclosure.

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems typically have hardware components participating in various control and input/output (I/O) functions. Marshaling cabinets have been used to gather the various components for communicating over I/O channels into a single location. These components can include equipment used for functions such as field cable descrambling, signal conditioning, protection, and disconnect hardware and energy-limiting barriers for field devices. Often times, the various components are arranged serially, with different columns of equipment performing different functions and with components in the different columns connected by wiring.

Typical approaches used in marshaling cabinets can suffer from various issues. For instance, some lower-cost approaches suffer from lower channel densities, meaning the number of I/O channels can be relatively low given the amount of space occupied by the equipment. Other approaches are smaller and therefore offer improved channel densities, but these approaches are relatively expensive. Further, a marshaling cabinet can be filled with assorted hardware with varying form factors from different vendors, making each cabinet unique and leading to repeating efforts (such as labor, coordination, procurement, and testing) for each project. In addition, because equipment can come from different vendors, it may be difficult to control the cost of an overall solution for a particular installation.

This disclosure describes a field termination assembly (FTA) that integrates signal conditioning hardware and other hardware for multiple I/O channels into a single structure. The FTA is suitable for use in marshaling cabinets or other locations for industrial process control and automation systems or other systems. The integration of different signal conditioning and other hardware functions together into an FTA helps to achieve improved channel densities, lower overall hardware footprints, lower solution costs, and improved usability. Moreover, adaptor modules used in an FTA can support the use of different types of I/O channels, and the FTA and the adaptor modules can support the use of mistake-proof keys. For example, mistake-proof keys can be placed on the adaptor modules, and receptacles for the keys can be placed in the FTA (or vice versa). Certain keys can be designed to fit within certain receptacles only in certain ways, such as when keys and receptacles having complementary shapes can be rotated for different types of I/O channels and/or when keys and receptacles having different complementary shapes can be used for different types of I/O channels. In some cases, different shapes can be used with different groups or classes of keys and receptacles, such as when analog modules use one shape, digital modules use another shape, and so on. In addition, a universal key might be used to allow an adaptor module to be inserted into most/all slots, or a universal block might be provided to block most/all adaptor modules from being inserted into a slot. This approach helps to ensure that appropriate types of adaptor modules are inserted into appropriate slots of the FTA, thereby reducing or eliminating the possibility of an incorrect type of adaptor module being inserted into and used in the FTA.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one I/O module 104 is coupled to the sensors 102a and actuators 102b. The I/O modules 104 facilitate interactions with the sensors 102a, actuators 102b, or other field devices. For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. As described below, the interactions with one or more field devices could occur through one or more field termination assemblies 114. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers. A third set of controllers 106 could be used to perform additional functions. It is also possible that one set of controllers could be in a stand-by or load sharing mode to improve overall availability of the system.

Controllers 106 are often arranged hierarchically in a system. For example, different controllers 106 could be used to control individual actuators, collections of actuators forming machines, collections of machines forming units, collections of units forming plants, and collections of plants forming an enterprise. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

The one or more networks 108 couple the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers 106 and operator stations 110 in FIG. 1 may represent computing devices. For example, each of the controllers and operator stations could include one or more processing devices, such as one or more microprocessors, microcontrollers, digital signal processors (DSPs), field programmable gate arrays (FPGAs), application specific integrated circuits (ASICs), or discrete circuitry. Each of the controllers 106 and operator stations 110 could also include one or more memories for storing instructions and data used, generated, or collected by the processing device(s), such as a random access memory, read only memory, Flash memory, optical disc, hard drive, or any other suitable volatile or non-volatile storage device(s). Each of the controllers 106 and operator stations 110 could further include at least one network interface, such as one or more Ethernet interfaces or wireless transceivers.

In process control and automation systems such as the system 100, I/O channels are used to connect controllers (such as the controllers 106) and field devices (such as the sensors 102a and actuators 102b). In general, the I/O modules 104 or other devices can support I/O channels of various types, including AIs, DIs, DISOEs, PIs, AOs, or DOs. Different I/O channel types are characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. Nos. 8,072,098; 8,392,626; 8,656,065; and U.S. Patent Publication No. 2015/0278144 (all of which are hereby incorporated by reference in their entirety). UIO circuits that support Universal Channel Technology available from HONEYWELL INTERNATIONAL INC. are also suitable for use.

As described in more detail below, at least one field termination assembly 114 can be used in the system 100 or other system. Each field termination assembly 114 includes one or more slots configured to receive one or more adaptor modules for one or more I/O channels, such as sixteen adaptor modules for sixteen I/O channels (although other numbers of adaptor modules and I/O channels can be supported). Each adaptor module can perform one or more functions related to I/O signals, such as signal conditioning, energy limiting, galvanic isolation, or protection (or any combination thereof). The adaptor modules can operate independently, meaning each adaptor module can perform its function(s) for its I/O channel regardless of whether other adaptor modules are present or what those other adaptor modules are doing.

In some embodiments, the slots of a field termination assembly 114 are universal, meaning different types of adaptor modules can be inserted into the slots of the field termination assembly 114. This may allow, for example, different adaptor modules to be designed for different types of I/O channels, such as different adaptor modules for AIs, DIs, DISOEs, PIs, AOs, and DOs. This may also allow different adaptor modules supporting different types of signal conditioning, intrinsic safety, galvanic isolation, protection, or other hardware functions to be designed. In general, any suitable adaptor modules can be used in a field termination assembly 114, and the field termination assembly 114 can include one or multiple types of adaptor modules.

As described in more detail below, each slot of a field termination assembly 114 can be configured to accept a particular type of adaptor module using a physical "mistake-proof" key. For example, different types of adaptor modules could include keys having unique designs or orientations, and the slots of the field termination assembly 114 could include receptacles configured to receive the keys of the adaptor modules. Each receptacle can have a design or orientation that is complementary to the expected design or orientation of the key for a particular type of adaptor module and not for other types of adaptor modules. For instance, the keys and/or the receptacles can be replaceable or configurable (such as rotatable) to configure each slot of the field termination assembly 114 in a manner corresponding to a particular type of adaptor module. Note that it is also possible to reverse the keys and receptacles so that the keys are placed in the slots and the receptacles are placed on the adaptor modules.

Essentially, each slot of the field termination assembly 114 can be configured ahead of time to receive a specific type of adaptor module. If an installer or other personnel install the correct type of adaptor module in a slot of the field termination assembly 114, the associated key can enter the associated receptacle. This allows the adaptor module to be seated properly and installed in the field termination assembly 114. If an installer or other personnel attempt to install an incorrect type of adaptor module in a slot of the field termination assembly 114, the associated key cannot enter the associated receptacle. Thus, the adaptor module cannot be seated properly and installed, thereby informing the personnel of the incorrect adaptor module type.

This can help to ensure that an operator or other personnel do not insert the wrong type of adaptor module into a slot of a field termination assembly 114. In particular embodiments, each slot of a field termination assembly 114 can be configured for a particular type of adaptor module and can receive that particular type of adaptor module in the factory or other setting. Later, if the "personality" of the slot needs any change (meaning a different type of adaptor module is needed in the slot), a maintenance engineer or other personnel can remove the physical key or receptacle of the particular slot using a tool and insert a different physical key or receptacle corresponding to the new type of adaptor module. Note, however, that the key/receptacle for each slot can be set in any other suitable manner.

In some embodiments, one or more field termination assemblies 114 can be used in a marshaling cabinet 116 or other marshaling structure. The marshaling structure can include additional components to support various functions, such as signal conditioning and protection of I/O channels. Note, however, that the field termination assemblies 114 can be used in any other suitable manner.

Although FIG. 1 illustrates one example of an industrial process control and automation system 100, various changes may be made to FIG. 1. For example, the system 100 could include any number of sensors, actuators, I/O modules, controllers, operator stations, networks, field termination assemblies, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which one or more field termination assemblies can be used. This functionality can be used in any other suitable system, and the system need not be related to industrial process control and automation.

Figure 2A:
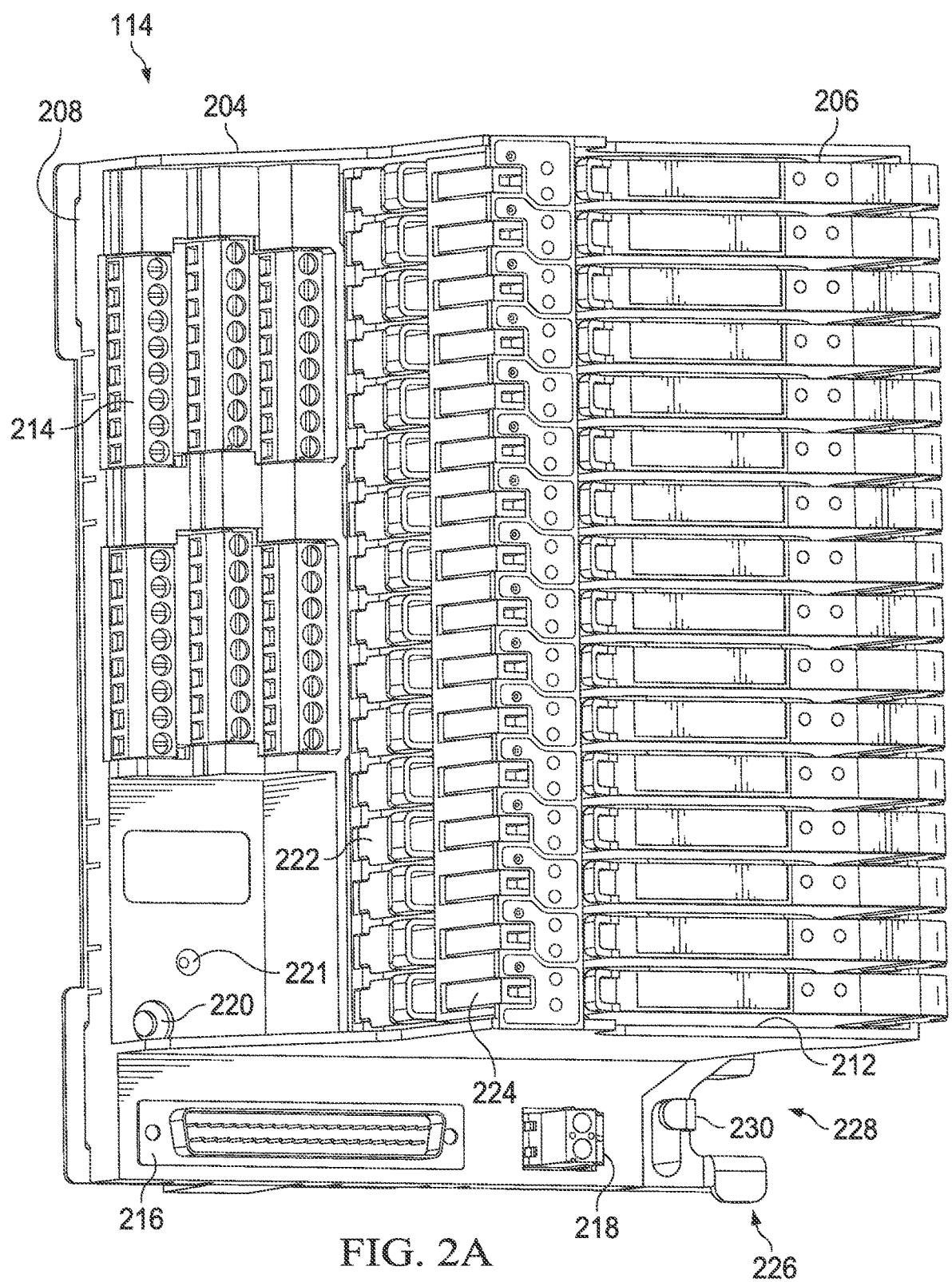
FIGS. 2A and 2B illustrate an example field termination assembly supporting the use of mistake-proof keys according to this disclosure.
Figure 2B:
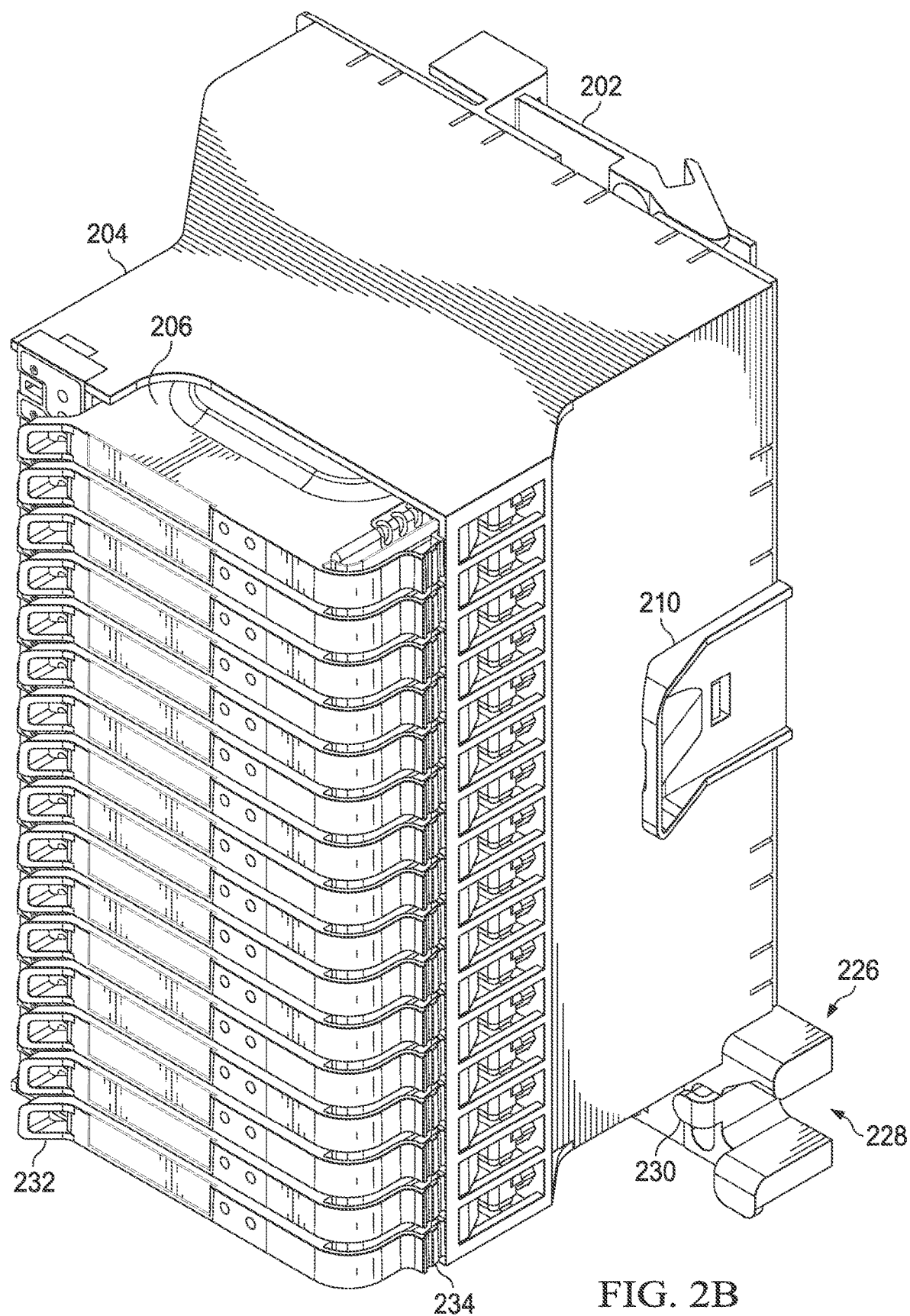

FIGS. 2A and 2B illustrate an example field termination assembly 114 supporting the use of mistake-proof keys according to this disclosure. For ease of explanation, the field termination assembly 114 of FIGS. 2A and 2B may be described as being used in the system 100 of FIG. 1. However, the field termination assembly 114 could be used in any other suitable system, regardless of whether or not that system is used for industrial process control and automation.

As shown in FIGS. 2A and 2B, the field termination assembly 114 includes a base 202, a housing 204, and multiple adaptor modules 206. The base 202 generally represents a structure configured to be mounted or otherwise coupled to a support and to receive and hold the housing 204 in place. For example, the base 202 could be mounted to a DIN rail or other rail in order to hold the field termination assembly 114 in place within a marshaling cabinet 116 or other structure. In this example, the base 202 includes one or more openings 208 that engage one or more flanges extending from one side of the housing 204. The base 202 also includes a latch 210 that can be placed on the opposite side of the housing 204. The flanges of the housing 204 could be inserted into, coupled to, or otherwise interact with the openings 208 of the base 202. Once that side of the housing 204 has engaged the base 202, the opposite side of the housing 204 can be pushed so that the latch 210 captures that side of the housing 204. This helps to hold the housing 204 in place while allowing later removal of the housing 204 from the base 202.

The base 202 includes any suitable structure configured to be coupled to a support and to receive and retain a field termination assembly housing. The base 202 can be formed from any suitable material(s), such as metal or ruggedized plastic. The base 202 can also be formed in any suitable manner, such as by using injection molding, machining, or additive manufacturing. In addition, the base 202 can have any suitable size, shape, and dimensions. Note that while the base 202 here uses specific mechanisms for capturing the housing 204, the base 202 can use any other suitable mechanism(s) to receive and retain the housing 204. Although the base 202 is shown here as fitting up against the housing 204, the base 202 could also include at least one cable duct that allows cables (such as cables coupling the field termination assembly 114 to sensors 102*a*, actuators 102*b*, or other field devices or to controllers 106) to be routed in a safe and concealed manner behind the housing 204.

The housing 204 generally represents a structure used to receive and retain (and possibly protect) other components of the field termination assembly 114. For example, the housing 204 in this example includes various slots 212 that can be used to receive the adaptor modules 206 of the field termination assembly 114. In this example, each slot 212 is generally elongated and rectangular, although each slot 212 can have any suitable size, shape, and dimensions. Also, in this example, there are sixteen slots 212, although the field termination assembly 114 could include any suitable number of slots 212.

The housing 204 includes any suitable structure configured to receive and retain adaptor modules and other components of a field termination assembly. The housing 204 can be formed from any suitable material(s), such as metal or ruggedized plastic. The housing 204 can also be formed in any suitable manner, such as by using injection molding, machining, or additive manufacturing. In addition, the housing 204 can have any suitable size, shape, and dimensions.

One or more field terminal blocks 214 extend through the housing 204 and are used to electrically couple one or more field devices (such as sensors 102*a*, actuators 102*b*, or other field devices) to other components of the field termination assembly 114. In this example, there are six sets of field terminal blocks 214, and each set includes eight screw terminals. However, the field termination assembly 114 could include any number of field terminal blocks 214, and each field terminal block 214 could support any number of electrical terminals or other mechanisms for forming electrical connections.

At least one mass termination cable (MTC) connector 216 also extends through the housing 204 and is used to electrically connect one or more other devices (such as one or more controllers 106) to the field termination assembly 114. In this example, the MTC connector 216 represents a single male-type connector with a number of pins designed to couple to a female-type connector of a mass termination cable. However, the MTC connector 216 could represent any other suitable type of connector. Also, it should be noted that individual or multiple connectors could also be used in place of the MTC connector 216.

Additional connectors 218 and 220 can be provided for coupling the field termination assembly 114 to a power supply and to ground, respectively. A visual indicator 221 can be provided to generate illumination when the field termination assembly 114 is receiving power or to identify other conditions of the field termination assembly 114. The visual indicator 221 represents any suitable illumination source, such as one or more light emitting diodes (LEDs).

The field termination assembly 114 also includes levers 222 and 224. Each slot 212 is associated with one of the levers 222 and one of the levers 224. Electrical fuses and electrical disconnects are integrated into the levers 222 and 224, respectively. The mechanical action of closing one of the levers 222 can result in the insertion of a fuse into the field termination assembly 114 for one of the adaptor modules 206. The levers 222 can also include a blown-fuse indicator (such as an LED indicator or other indicator) to identify when the associated fuse has blown. Similarly, the mechanical action of closing one of the levers 224 can result in the insertion of a knife disconnect or other disconnect into the field termination assembly 114 for one of the adaptor modules 206. The levers 222 and 224 can be operated independently, meaning each lever 222 and 224 can be used to individually insert or remove a fuse or disconnect for one adaptor module 206 without affecting other adaptor modules 206.

In some embodiments, the levers 222 and 224 are designed to be operated by a tool, such as a screwdriver (rather than being finger-operated mechanisms). Tool-based operation can help to eliminate access issues for operators, since people generally need wider spaces for access using their fingers. Tool-based access may allow for standardization of the slot width and lever width, such as to a size of less than 10 mm, and the integration of more channels into a given space. However, the levers 222 and 224 can be operated in any other suitable manner. In some embodiments, it is also possible to replace a fuse with a bypass for at least one adaptor module 206 so that an electrical connection can be formed without providing a fuse function.

The base 202 in this example also includes an extension 226 used for cable management. In this example, the extension 226 includes an opening 228 that allows a mass termination cable or other cable(s) to pass through the extension 226 and be coupled to the MTC connector 216 or other connector(s) of the field termination assembly 114. A notch 230 in the extension 226 can be used to allow the mass termination cable or other cable(s) to be zip-tied or otherwise secured to the extension 226. Note that the specific form of the extension 226 here is for illustration only and that other cable management techniques could be supported. It is also possible to omit the extension 226 from the housing 204.

As noted above, each adaptor module 206 may perform one or more functions related to an I/O signal. For example, each adaptor module 206 could include circuitry that supports hardware functions such as signal conditioning, energy limiting, galvanic isolation, or protection (or any combination thereof). At least some adaptor modules 206 may be designed for use with specific types of I/O signals. For example, an adaptor module 206 could be configured to provide signal conditioning, energy limiting, galvanic isolation, protection, or a combination thereof for an analog input, digital input, digital input sequence of events, pulse accumulator input, analog output, or digital output. An adaptor module 206 could alternatively support the use of a universal or reconfigurable I/O channel, in which case the adaptor module 206 could be configured to provide signal conditioning, energy limiting, galvanic isolation, protection, or a combination thereof for a universal or reconfigurable I/O channel. Note, however, that not all adaptor modules 206 may need to function in this manner. For instance, at least one "feed-through" or "pass-through" adaptor module 206 could be used to electrically link at least one I/O channel to external circuitry, where the external circuitry provides signal conditioning, energy limiting, galvanic isolation, protection, or a combination thereof for the at least one I/O channel.

In this example, each adaptor module 206 includes a handle 232 and a latch 234. The handle 232 represents a raised portion of the front surface or other portion of the adaptor module 206 that facilitates movement of the adaptor module 206. The latch 234 represents a flexible extension from a side of the adaptor module 206. Part of the latch 234 can be pushed inward when the adaptor module 206 is being inserted into a slot 212 and used to secure the adaptor module 206 to the housing 204. Note that the form of the handle 232 and the form of the latch 234 are for illustration only and that other handles and latches could be used. The handles or the latches could also be omitted.

Various other features can also be used with or supported by the field termination assembly 114. For example, each slot 212 of the field termination assembly 114 could be bypassed, such as when an adaptor module 206 is implemented externally and coupled to the field termination assembly 114. As another example, the field termination assembly 114 and its cabling can comply with any suitable hazardous location (HazLoc) requirements. As yet another example, the field termination assembly 114 can include at least one printed circuit board forming a backplane, and a safety earth ground connection to the printed circuit board can be made with a rail, cabinet, or other structure without any additional cabling of clips. As still another example, adequate insulation can be provided on fuse and disconnect terminals of the field termination assembly 114 to avoid exposing high-voltage terminals to an operator while opening or after opening one or more of the fuse/disconnect levers 222 and 224. This can help to protect the operator from high-voltage or thermal hazards, which can be useful when the field devices coupled to the field termination assembly 114 are of the high-voltage type. Any other or additional functionality can be added to the field termination assembly 114 as needed or desired.

Although FIGS. 2A and 2B illustrate one example of a field termination assembly 114 supporting the use of mistake-proof keys, various changes may be made to FIGS. 2A and 2B. For example, the overall form factor of the field termination assembly 114 and the form factors of its various components are for illustration only. Also, mistake-proof keys can be used in any other suitable field termination assembly 114 or other structure in which modules are used. In addition, components could be added, omitted, combined, further subdivided, or placed in any other suitable configuration according to particular needs.

Figure 3:
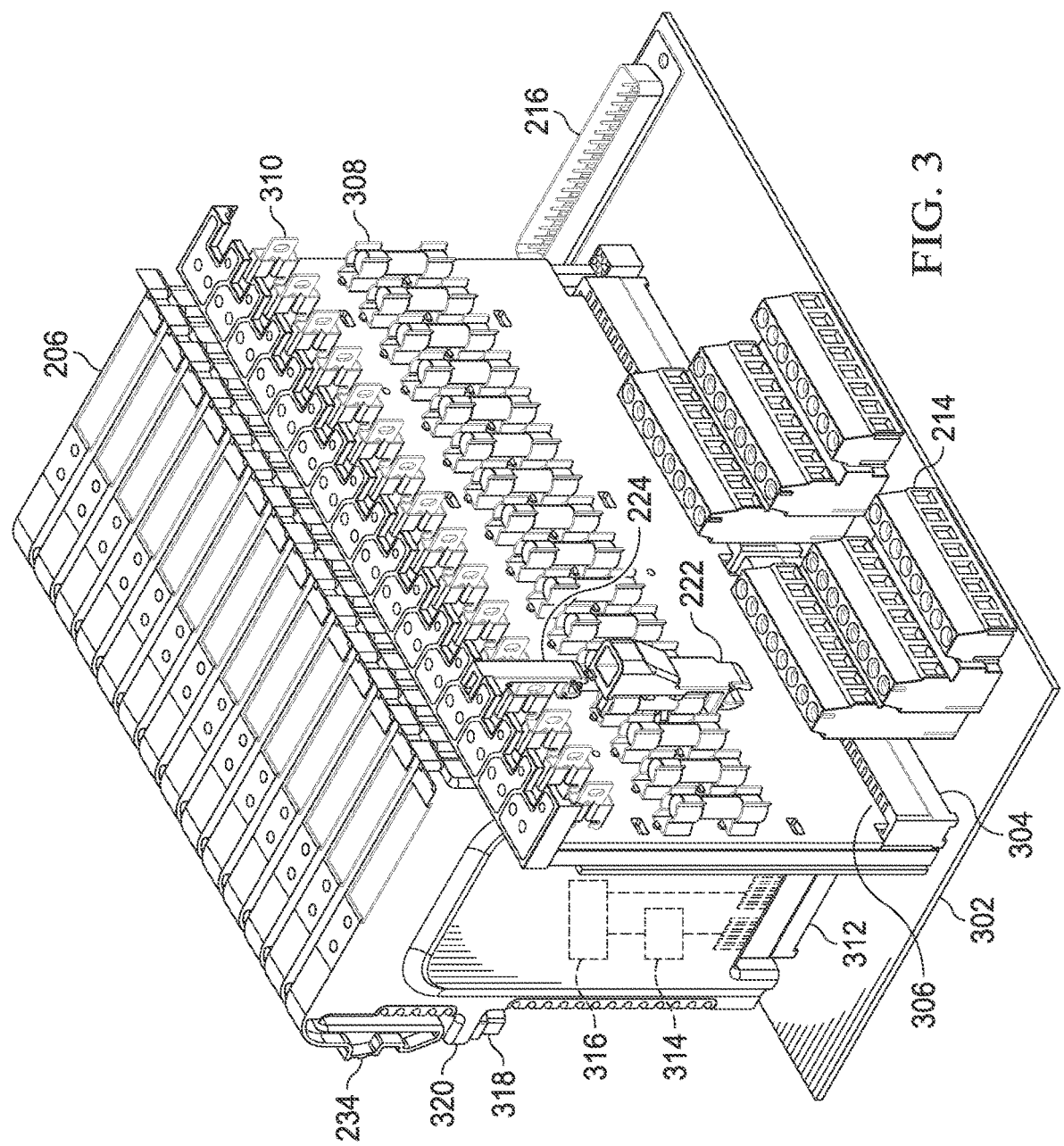
FIG. 3 illustrates example internal components of a field termination assembly according to this disclosure.

FIG. 3 illustrates example internal components of a field termination assembly 114 according to this disclosure. For ease of explanation, the field termination assembly 114 of FIG. 3 may be described as supporting the same form shown in FIGS. 2A and 2B and being used in the system 100 of FIG. 1. However, the field termination assembly 114 could have any other suitable form and be used in any other suitable system.

As shown in FIG. 3, the field termination assembly 114 includes a first printed circuit board (PCB) 302, which carries (among other things) the field terminal blocks 214, MTC connector 216, and additional connectors 218 and 220. The first PCB 302 also includes connectors 304, which allow a second PCB 306 to be electrically connected to the first PCB 302. The second PCB 306 carries (among other things)

pairs of electrical terminals 308 that can receive fuses held by the levers 222 and electrical terminals 310 that can receive disconnects held by the levers 224. The first PCB 302 further includes multiple connectors 312, each of which allows one of the adaptor modules 206 to be electrically connected to the first PCB 302. The first PCB 302 could be referred to as a backplane of the field termination assembly 114.

Each of the adaptor modules 206 in this example includes isolation circuitry 314 and energy limiting circuitry 316. The isolation circuitry 314 generally operates to clamp power or communication signals, such as to a voltage that complies with a relevant safety standard (like IEC 60079-xx). In some embodiments, the isolation circuitry 314 can clamp power or communication signals from 250V to a much lower voltage. Depending on the implementation, the isolation circuitry 314 could perform voltage clamping and galvanic isolation for both the power and the communication signals. In particular embodiments, the isolation circuitry 314 can perform voltage clamping and galvanic isolation for both serial communication (such as RS485) and DC power (such as 24 VDC) coming from a controller cabinet or other source, although other power or communication signals could be used. Also, in particular embodiments, the isolation circuitry 314 could be implemented according to suitable guidelines for use in a "zone 0," "zone 1," or "zone 2" environment.

In some embodiments, one or more voltage clamping circuits can be used in the isolation circuitry 314. Each voltage clamping circuit could be passive or active, and galvanic isolation could be provided before or after the voltage clamp. Each voltage clamping circuit includes any suitable structure for limiting the voltage of a power signal or at least one communication signal. For instance, resistive elements could be used as a power and current-limiting circuit for communication channels or other channels carrying data signals to or from a safe area. Suitable isolation techniques (such as opto, transformer, or capacitive) may be implemented for channels carrying data signals. Outputs from the isolation circuitry 314 can be functionally the same as inputs to the isolation circuitry 314, but the outputs from the isolation circuitry 314 are voltage-limited. In some cases, the outputs are voltage-limited to a voltage lower than 250 V, although the exact value depends on the design.

The energy limiting circuitry 316 generally operates to limit the amount of electrical energy made available to a field device through the adaptor module 206. For example, the energy limiting circuitry 316 could limit the voltage and current that is supplied to the field device through the adaptor module 206. The energy limiting circuitry 316 includes any suitable structure for limiting electrical energy provided through an adaptor module 206. For instance, the energy limiting circuitry 316 could be implemented using resistive elements near the outputs of the adaptor module 206.

The first and second PCBs 302 and 306 define various electrical pathways between components of the field termination assembly 114. For example, electrical pathways could be formed between the connectors 216, 218, 220 and the electrical terminals 308, 310 (via the connectors 304). These electrical pathways allow power and communication signals to pass through the fuses held by the levers 222 and the disconnects held by the levers 224. Additional electrical pathways could be formed between the electrical terminals 308, 310 and the isolation circuitry 314 of the adaptor modules 206 (via the connectors 304 and 312). These electrical pathways allow power to flow to the adaptor modules 206 and allow communication signals to flow to and/or from the adaptor modules 206. Within each adaptor module 206, electrical pathways couple the isolation circuitry 314 and the energy limiting circuitry 316 to each other. In addition, electrical pathways couple the adaptor modules 206 to field devices (via the connectors 312 and the field terminal blocks 214). In general, these electrical pathways help to ensure that power is received, flows through the fuses and disconnects to the adaptor modules 206, and flows from the adaptor modules 206 to the field devices through the field terminal blocks 214. These electrical pathways also help to ensure that data is transported between a mass termination cable or other cable(s) and the field devices through the connector 216, the fuses and disconnects, the adaptor modules 206, and the field terminal blocks 214.

Note that the designs of the adaptor modules 206 can vary as needed or desired, and one or both of the isolation circuitry 314 and the energy limiting circuitry 316 may be omitted. For example, one of the isolation circuitry 314 and the energy limiting circuitry 316 may be omitted if that functionality is not needed with a particular I/O channel or a particular type of I/O channel. As another example, if an adaptor module 206 represents a feed-through or pass-through module, both the isolation circuitry 314 and the energy limiting circuitry 316 may be omitted, and one or more electrical paths may simply be used to couple an I/O channel to other components of the field termination assembly 114.

In this example, it can be seen that each adaptor module 206 includes a mistake-proof key 318. The mistake-proof key 318 generally extends from a projection 320 on the side of the adaptor module 206 towards a back of the adaptor module 206. The mistake-proof key 318 generally represents a structure that can engage a corresponding receptacle in a slot 212 of the housing 204 in order to verify that the proper type of adaptor module 206 is being inserted into the slot 212. The mistake-proof key 318 can take various forms, examples of which are provided below. In this way, only a specific type of adaptor module 206 is usable in a slot 212 of the housing 204 since the mistake-proof key 318 is paired to a receptacle of the slot 212.

Although FIG. 3 illustrates examples of internal components of a field termination assembly 114, various changes may be made to FIG. 3. For example, the field termination assembly 114 does not need to include separate PCBs arranged as shown in FIG. 3. In general, various layouts and arrangements of the components of the field termination assembly 114 could be used to achieve the desired functionality of the field termination assembly 114.

Figure 4:
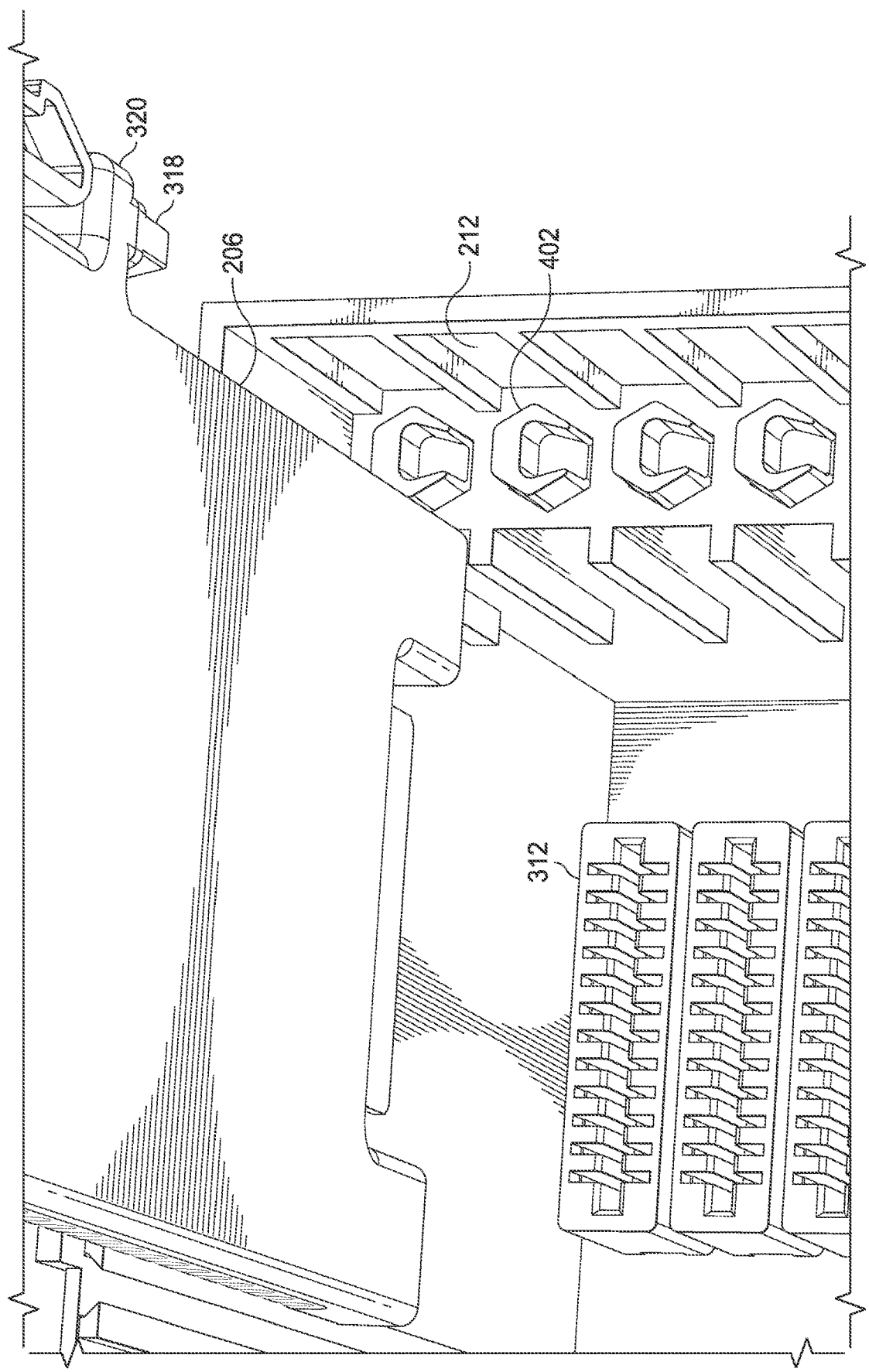
FIG. 4 illustrates a portion of an example field termination assembly supporting the use of mistake-proof keys according to this disclosure.
Figure 6C:
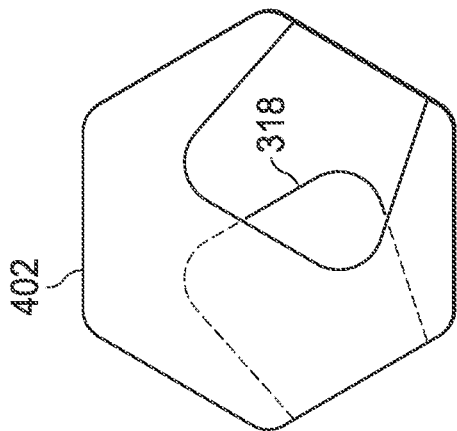
FIGS. 6A through 6F illustrate a first example keying for adaptor modules used with a field termination assembly according to this disclosure.
Figure 6F:
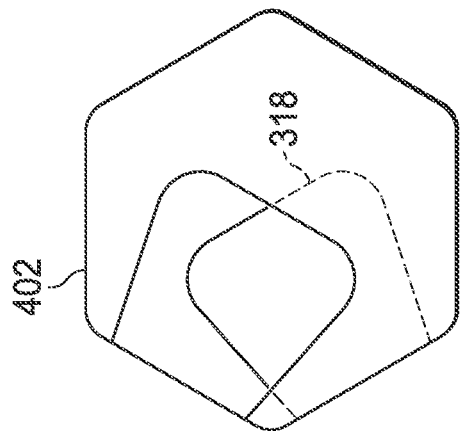
Figure 6B:
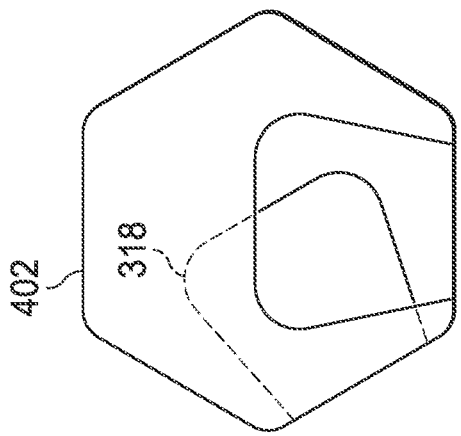
Figure 6E:
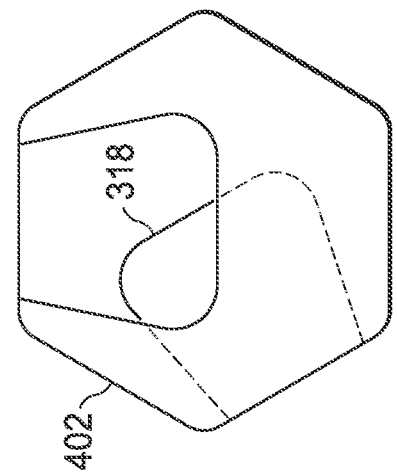
Figure 6A:
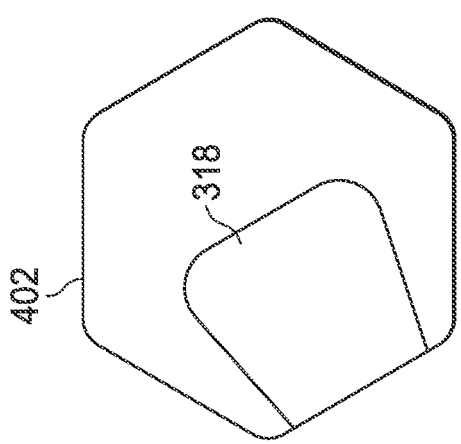
Figure 6D:
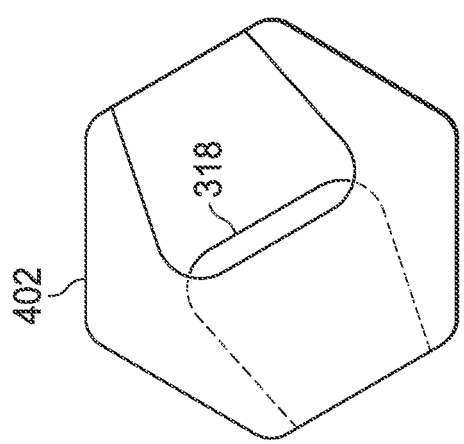
Figure 7A:
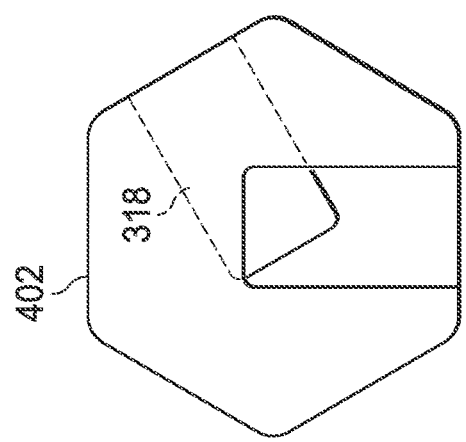
FIGS. 7A through 7F illustrate a second example keying for adaptor modules used with a field termination assembly according to this disclosure.
Figure 7B:
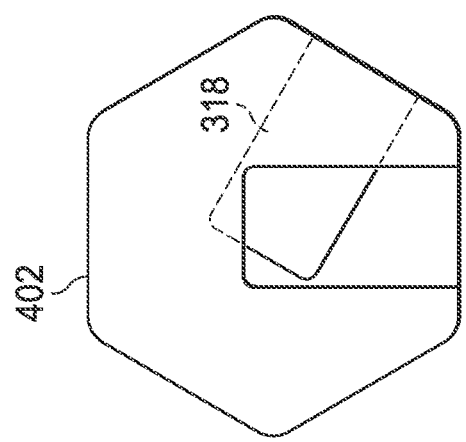
Figure 7C:
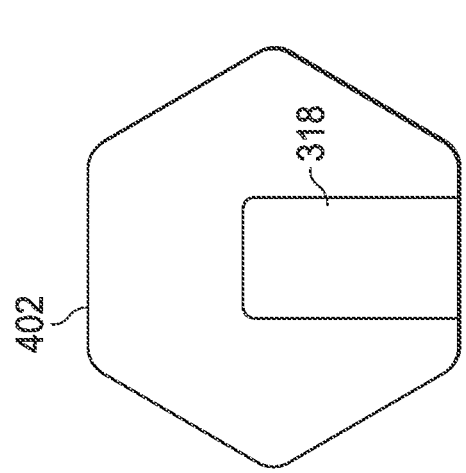
Figure 7D:
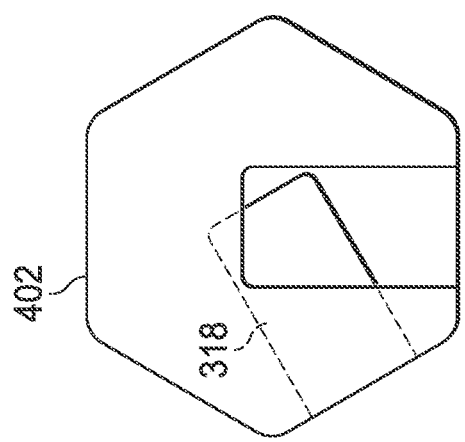
Figure 7E:
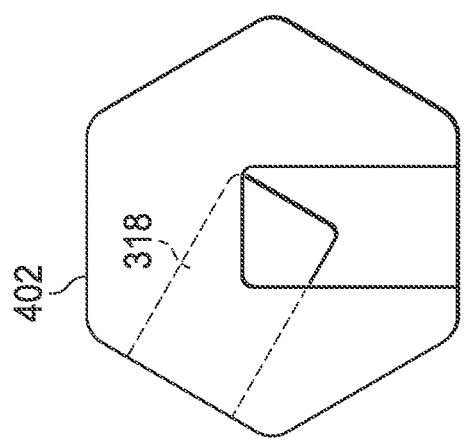
Figure 7F:
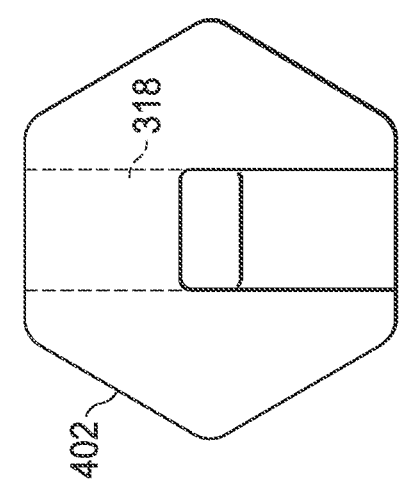

FIG. 4 illustrates a portion of an example field termination assembly 114 supporting the use of mistake-proof keys according to this disclosure, and FIG. 5 illustrates a portion of an example adaptor module 206 having a mistake-proof key according to this disclosure. As shown in FIG. 4, at the back of each slot 212 in the housing 204 is a receptacle 402. As shown in FIGS. 4 and 5, the key 318 of each adaptor module 206 can extend from the projection 320 back towards the associated receptacle 402 when the adaptor module 206 is inserted into a corresponding slot 212 in the housing 204. Each receptacle 402 may be referred to as a "lock" since the receptacle 402 is designed to engage with a particular type of key 318.

Each receptacle 402 here is designed to receive a key 318 having a particular design/orientation, and each key 318 is designed to fit within a receptacle 402 having an opening with a particular design/orientation. In this example, each key 318 has a generally trapezoidal cross-sectional shape with at least two rounded corners. Each receptacle 402 includes an opening that has a complementary shape, meaning an opening with a generally trapezoidal cross-sectional shape having at least two rounded corners. Note, however, that the shapes of the keys 318 and the openings of the receptacles 402 can vary widely as needed or desired. In this example, the receptacles 402 and/or the keys 318 can be rotated to one of six distinct rotational positions. Thus, the keys 318 and the receptacles 402 can be used to allow up to six different types of adaptor modules 206 to be inserted into the slots 212 of the housing 204 in the field termination assembly 114.

In some embodiments, each key 318 is long enough so that one or more electrical connections cannot be formed with an adaptor module 206 unless and until the key 318 of the adaptor module 206 fits within the corresponding receptacle 402 of the housing 204. If someone attempts to insert an incorrect type of adaptor module 206 into a slot 212 of the housing 204, the one or more electrical connections cannot be formed with the adaptor module 206, helping to prevent damage to the adaptor module 206 or to other components. It should be noted, however, that not all electrical connections may need to be blocked prior to insertion of a key 318 into a receptacle 402. For instance, one or more connections for data communications may be formed even if the associated key 318 cannot fit into the receptacle 402 of a slot 212, as long as one or more connections for power cannot be formed until the key 318 is inserted into the receptacle 402.

Note that in this example, the same keys 318 and the same receptacles 402 can be used regardless of the types of adaptor modules 206 being used. One may only need to rotate a key 318 and/or a receptacle 402 in order to configure a particular slot 212 for use with a particular type of adaptor module 206. However, this need not be the case. For example, it is also possible for keys 318 to have different shapes and for the receptacles 402 to have openings of different shapes for different types of adaptor modules 206. As a particular example, each general class of adaptor module 206 (such as analog, digital, etc.) may use its own unique shape for its keys and receptacles, and different classes of adaptor modules 206 may use different unique shapes for their keys and receptacles. Also, within each class, different orientations of the keys and receptacles could be used for different channel types (such as inputs, outputs, etc.). As long as the key 318 for one type of adaptor module 206 only fits within the receptacle 402 for that type of adaptor module 206, the shapes and sizes of the keys 318 and receptacles 402 can vary in a number of ways.

Although FIG. 4 illustrates a portion of one example of a field termination assembly 114 supporting the use of mistake-proof keys and FIG. 5 illustrates a portion of one example of an adaptor module 206 having a mistake-proof key, various changes may be made to FIGS. 4 and 5. For example, the form factors of the housing 204 and the adaptor module 206 are for illustration only. Also, as noted above, it is possible for the receptacles 402 to be placed on the adaptor modules 206 and for the keys 318 to be used in the slots 212 of the housing 204.

FIGS. 6A through 6F illustrate a first example keying for adaptor modules 206 used with a field termination assembly 114 according to this disclosure. In particular, FIGS. 6A through 6F illustrate how the key 318 shown in FIGS. 4 and 5 can fit within the openings of the receptacles 402 shown in FIG. 5 only in one orientation of the receptacles 402 (shown in FIG. 6A). In all other orientations of the receptacles 402 (shown in FIGS. 6B through 6F), the key 318 is prevented from entering the openings of the receptacles 402.

FIGS. 7A through 7F illustrate a second example keying for adaptor modules 206 used with a field termination assembly 114 according to this disclosure. In this example, the key 318 has a rectangular cross-sectional shape, and the key 318 is longer and thinner than the version of the key 318 shown in FIGS. 6A through 6F. This version of the key 318 can fit within the opening of a receptacle 402 having a complementary rectangular cross-sectional shape. Again, this version of the key 318 can fit within the opening of the receptacle 402 only in one orientation of the receptacles 402 (shown in FIG. 7A). In all other orientations of the receptacles 402 (shown in FIGS. 7B through 7F), the key 318 is prevented from entering the openings of the receptacles 402.

FIGS. 8A through 8F illustrate a third example keying for adaptor modules 206 used with a field termination assembly 114 according to this disclosure. In this example, the key 318 has a circular cross-sectional shape, which is wider and shorter than the version of the key 318 shown in FIGS. 7A through 7F. This version of the key 318 can fit within the opening of a receptacle 402 having a complementary circular cross-sectional shape. Once again, this version of the key 318 can fit within the opening of the receptacle 402 only in one orientation of the receptacles 402 (shown in FIG. 8A). In all other orientations of the receptacles 402 (shown in FIGS. 8B through 8F), the key 318 is prevented from entering the openings of the receptacles 402.

Notice here that the various versions of the keys 318 shown in FIGS. 6A through 8F can be used exclusively with their corresponding receptacles 402 shown in FIGS. 6A through 8F. That is, the trapezoidal key 318 in FIGS. 6A through 6F cannot fit within the rectangular and circular receptacles 402 in FIGS. 7A through 8F. The rectangular key 318 in FIGS. 7A through 7F cannot fit within the trapezoidal and circular receptacles 402 in FIGS. 6A through 6F and 8A through 8F. The circular key 318 in FIGS. 8A through 8F cannot fit within the trapezoidal and rectangular receptacles 402 in FIGS. 6A through 7F. Thus, all of these shapes (or other combinations of shapes supporting mutually-exclusive use of different adaptor modules 206) can be used in a field termination assembly 114.

Figure 9B:
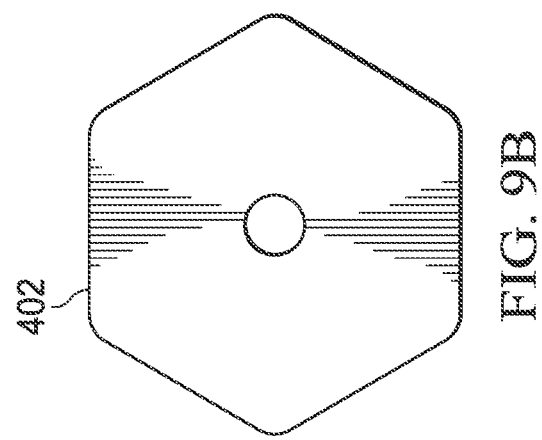
FIGS. 9A and 9B illustrate example universal keying for adaptor modules used with a field termination assembly according to this disclosure.
Figure 9A:
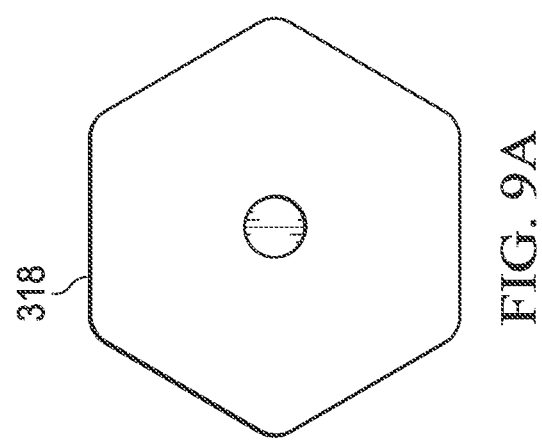

FIGS. 9A and 9B illustrate example universal keying for adaptor modules 206 used with a field termination assembly 114 according to this disclosure. In FIG. 9A, the key 318 represents a universal key that could be used with most/all receptacles 402. In this example, the key 318 is defined by an outer perimeter that contains substantially open space, with only a small cylindrical structure in the middle of the key 318. This version of the key 318 can fit within any of the receptacles 402 shown in FIGS. 6A through 8F or any other receptacle 402 that is open in the middle. Of course, the key 318 in FIG. 9A could also omit the small cylindrical structure and be completely open, enabling the key 318 to be used with any receptacle 402 (or at least any receptacle 402 that can accommodate the outer perimeter of the key 318 in FIG. 9A). In some embodiments, use of a universal key 318 may be limited to particular adaptor modules 206 (such as feed-through or pass-through adaptor modules 206), although this need not be the case.

In an inverse manner, in FIG. 9B, the receptacle 402 represents a universal channel block that can prevent the use of most/all keys 318 and there substantially or completely prevent the use of a slot 212. In this example, the receptacle 402 is defined by an outer perimeter that contains substantially closed space, with only a small cylindrical opening in the middle of the receptacle 402. This version of the receptacle 402 may block the use of all keys 318 except the universal key 318 shown in FIG. 9A. Of course, the receptacle 402 in FIG. 9B could also omit the small cylindrical opening and be completely closed, blocking the use of all keys 318.

Although FIGS. 6A through 9B illustrate examples of keying for adaptor modules 206 used with a field termination assembly 114, various changes may be made to FIGS. 6A through 9B. For instance, the keys 318 and receptacles 402 could be rotatable to any number of positions and are not limited to use with six different rotatable positions. Also, the examples shown in FIGS. 6A through 9B are for illustration and explanation only, and any other suitable keys 318 and receptacles 402 could be used here. Each of the keys 318 and receptacles 402 could have any other suitable size, shape, or design.

Figure 10:
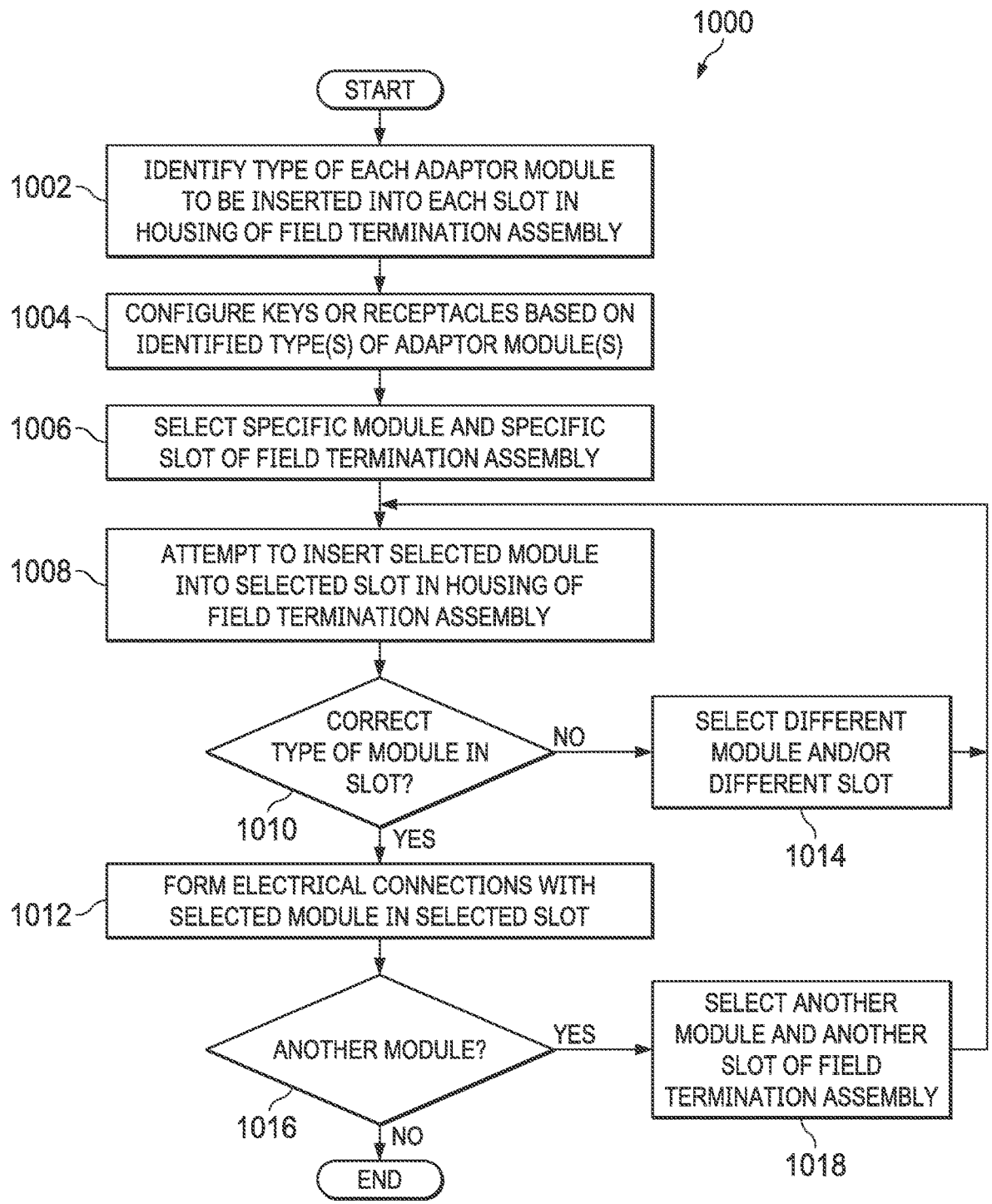
FIG. 10 illustrates an example method for field termination supporting the use of mistake-proof keys according to this disclosure.

FIG. 10 illustrates an example method 1000 for field termination supporting the use of mistake-proof keys according to this disclosure. For ease of explanation, the method 1000 of FIG. 10 may be described as being used with the field termination assembly 114 of FIGS. 2A, 2B, and 3 in the system 100 of FIG. 1 using the mistake-proof keying approach shown in FIGS. 4, 5, and 6A through 6F. However, the method 1000 could be used with any suitable device in any other suitable system and with any suitable mistake-proof keying approach.

As shown in FIG. 10, the type of adaptor module to be inserted into each slot in the housing of a field termination assembly is identified at step 1002. This could include, for example, personnel identifying whether each slot 212 in the housing 204 of the field termination assembly 114 is going to contain an adaptor module 206 for an analog input, digital input, digital input sequence of events, pulse accumulator input, analog output, digital output, or universal or reconfigurable I/O channel.

Keys and/or receptacles are configured based on the identified type or types of adaptor modules to be inserted into the slots in the housing of the field termination assembly at step 1004. This could include, for example, personnel ensuring that the receptacle 402 in each slot 212 of the housing 204 matches the expected key 318 of the type of adaptor module 206 to be inserted into that slot 212. As noted above, each slot 212 could include a key 318, and each adaptor module 206 could include a receptacle 402. If the key 318 and receptacle 402 do not match for an adaptor module-slot pair, corrective action can be taken. For instance, personnel may rotate the key 318 and/or the receptacle 402, replace the key 318 and/or the receptacle 402, or perform other action so that the key 318 matches the receptacle 402. Note that in some embodiments, the key 318 or receptacle 402 carried by the adaptor module 206 could be fixed (not replaceable or rotatable), such as when the adaptor module 206 has a fixed type that cannot change. In these embodiments, only the key 318 or receptacle 402 in the slot 212 of the housing 204 may be changed (since the slot 212 is typically able to receive adaptor modules 206 of different types).

A specific adaptor module and a specific slot of the field termination assembly are selected at step 1006. This could include, for example, personnel selecting one of the adaptor modules 206 and the slot 212 into which the personnel believes the selected adaptor module 206 is to be inserted. An attempt is made to insert the selected adaptor module into the selected slot at step 1008. This could include, for example, personnel pushing the selected adaptor module 206 into the selected slot 212. If the selected slot is configured to receive the type of the selected adaptor module at step 1010, electrical connections with the selected adaptor module in the selected slot are formed at step 1012. This could include, for example, the key 318 of the adaptor module 206 fitting within the opening of the receptacle 402 for that slot 212 (or the key 318 for that slot 212 fitting within the opening of the receptacle 402 of the adaptor module 206). This could also include personnel pushing pins or other electrical structures of the adaptor module 206 into the connector 312 of the associated slot 212 to form electrical pathways for power and communication signals. Thus, only a specific type of adaptor module 206 is usable in the slot 212.

If the selected slot is not configured to receive the type of the selected adaptor module at step 1010, the key 318 of the adaptor module 206 will not fit within the opening of the receptacle 402 for that slot 212 (or the key 318 for that slot 212 will not fit within the opening of the receptacle 402 of the adaptor module 206). Thus, a different adaptor module and/or a different slot are selected at step 1014, and the process returns to step 1008. In this way, the keying scheme disclosed here helps to prevent the wrong types of adaptor modules 206 from being inserted into the slots 212 of the field termination assembly 114. If necessary, the process could alternatively return to step 1004 from step 1010 if the key or receptacle was incorrectly configured.

Once the selected adaptor module is properly inserted into the selected slot, a determination can be made whether there is at least one additional adaptor module to be inserted into the field termination assembly at step 1016. If so, the next adaptor module and another slot are selected at step 1018, and the process returns to step 1008. Otherwise, the process ends, at which point each slot 212 of the housing 204 in the field termination assembly 114 should have received an adaptor module 206 of the correct or expected type.

Although FIG. 10 illustrates one example of a method 1000 for field termination supporting the use of mistake-proof keys, various changes may be made to FIG. 10. For example, while shown as a series of steps, various steps in FIG. 10 can overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system,"

"processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a housing comprising multiple slots;
a first printed circuit board carrying first connectors configured to be coupled to multiple external devices, a second connector configured to be coupled to at least one additional external device, and a power connector; and
a second printed circuit board electrically coupled to the first printed circuit board, the second printed circuit board carrying fuses and electrical disconnects associated with the multiple adaptor modules;
multiple adaptor modules each configured to be inserted into one of the slots and to perform at least one function related to an associated input or output signal;
wherein, for each slot-adaptor module pair, the slot comprises one of a key and a receptacle configured to receive the key, and the adaptor module comprises the other of the key and the receptacle;
wherein each key fits into the receptacle associated with one type of adaptor module and cannot fit into the receptacles associated with other types of adaptor modules;
wherein each receptacle accepts the key associated with one type of adaptor module and cannot accept the keys associated with other types of adaptor modules;
wherein each of at least one of the keys and the receptacles is rotatable to achieve one of multiple different orientations; and
wherein different ones of the keys have different cross-sectional shapes.

2. The system of claim 1, wherein each of the slots is configured to receive any of the different types of adaptor modules.

3. The system of claim 1, wherein:
the housing comprises the receptacles; and
the adaptor modules comprise the keys.

4. The system of claim 1, wherein:
the housing and the adaptor modules form at least part of a field termination assembly; and
the field termination assembly further comprises multiple electrical terminals configured to be electrically coupled to multiple field devices in an industrial process control and automation system.

5. The system of claim 1, wherein at least one of the keys comprises a universal key configured to be inserted into most or all of the receptacles.

6. The system of claim 1, wherein at least one of the receptacles comprises a universal channel block configured to block insertion of most or all of the keys.

7. The system of claim 1, wherein:
the different cross-sectional shapes are associated with different classes of adaptor modules; and
the different orientations are associated with different channel types within each class of adaptor module.

8. An apparatus comprising:
a housing comprising multiple slots, each slot configured to receive an adaptor module that performs at least one function related to an associated input or output signal;
wherein: a first printed circuit board is configured to be electrically coupled to the adaptor module and carries first connectors configured to be coupled to multiple external devices, a second connector configured to be coupled to at least one additional external device, and a power connector; and
the apparatus further comprises a second printed circuit board electrically coupled to the first printed circuit board, the second printed circuit board carrying fuses and electrical disconnects associated with the multiple adaptor modules;
wherein each slot comprises one of (i) a key configured to be inserted into a receptacle of the associated adaptor module or (ii) a receptacle configured to receive a key of the associated adaptor module;
wherein one of:
each key fits into the receptacle associated with one type of adaptor module and cannot fit into the receptacles associated with other types of adaptor modules; or
each receptacle accepts the key associated with one type of adaptor module and cannot accept the keys associated with other types of adaptor modules;
wherein each of at least one of the keys and the receptacles is rotatable to achieve one of multiple different orientations; and
wherein different ones of the keys have different cross-sectional shapes.

9. The apparatus of claim 8, wherein each of the slots is configured to receive any of the different types of adaptor modules.

10. The apparatus of claim 8, wherein:
the first connectors are configured to be coupled to multiple field devices in an industrial process control and automation system; and
the second connector is configured to be coupled to at least one process controller in the industrial process control and automation system.

11. The apparatus of claim 8, wherein the different cross-sectional shapes comprise trapezoidal, rectangular, and circular cross-sectional shapes.

12. The apparatus of claim 8, wherein:
the different cross-sectional shapes are associated with different classes of adaptor modules; and
the different orientations are associated with different channel types within each class of adaptor module.

13. A method comprising:
inserting multiple adaptor modules into multiple slots of a housing, each adaptor module configured to perform at least one function related to an associated input or output signal; and
matching, for each slot-adaptor module pair, a key and a receptacle configured to receive the key, the slot comprising one of the key and the receptacle, the adaptor module comprises the other of the key and the receptacle;
wherein each key fits into the receptacle associated with one type of adaptor module and cannot fit into the receptacles associated with other types of adaptor modules;

wherein each receptacle accepts the key associated with one type of adaptor module and cannot accept the keys associated with other types of adaptor modules;

wherein each of at least one of the keys and the receptacles is rotatable to achieve one of multiple different orientations; and wherein different ones of the keys have different cross-sectional shapes; and wherein at least one of the keys comprises a universal key configured to be inserted into most or all of the receptacles.

14. The method of claim 13, wherein each of the slots is configured to receive any of the different types of adaptor modules.

15. The method of claim 13, wherein at least one of the receptacles comprises a universal channel block configured to block insertion of most or all of the keys.

16. The method of claim 13, wherein:

the different cross-sectional shapes are associated with different classes of adaptor modules; and the different orientations are associated with different channel types within each class of adaptor module.

* * * * *